F. A. TOWNSLEY.
LIFE SAVING DEVICE FOR AEROPLANES.
APPLICATION FILED SEPT. 14, 1918.
1,337,336.
Patented Apr. 20, 1920.
2 SHEETS—SHEET 1.
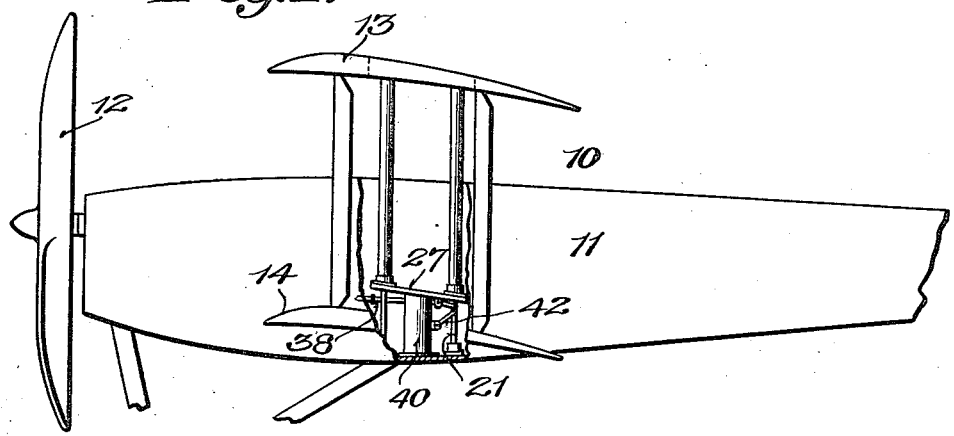
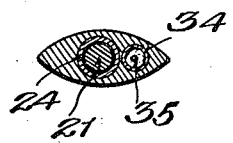
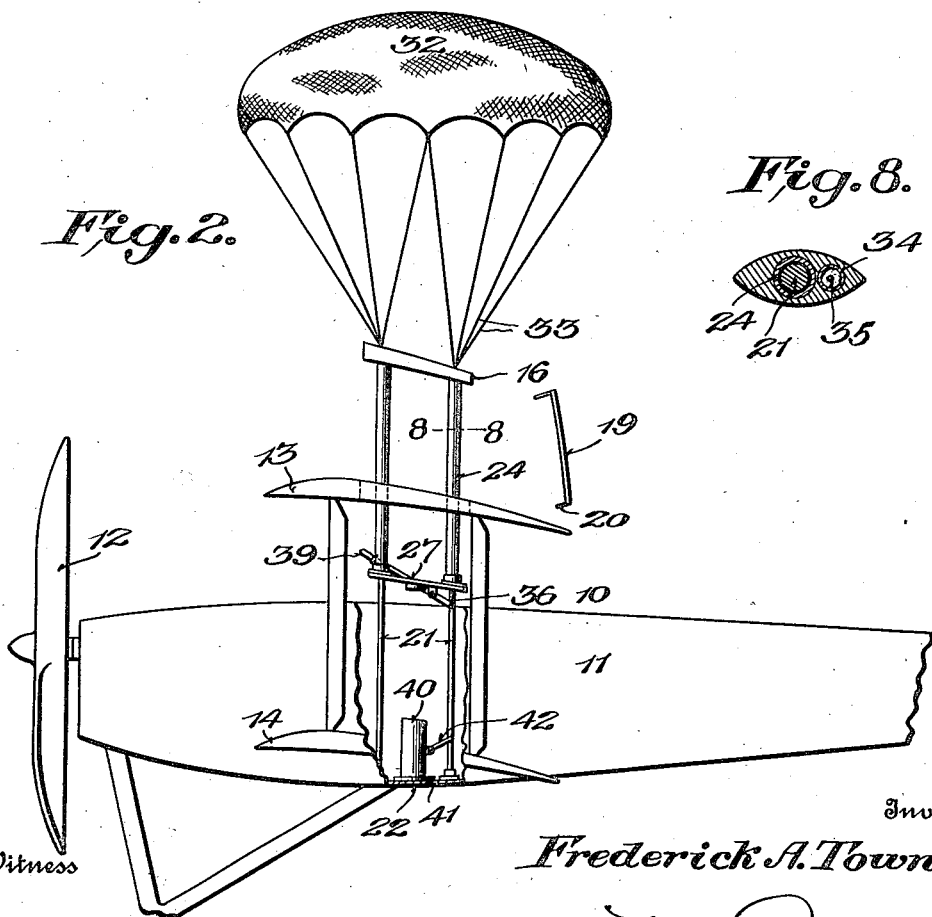
Witness
Chas. L. Griesbauer
Inventor
Frederick A. Townsley,
By F. K. Bryant.
Attorney

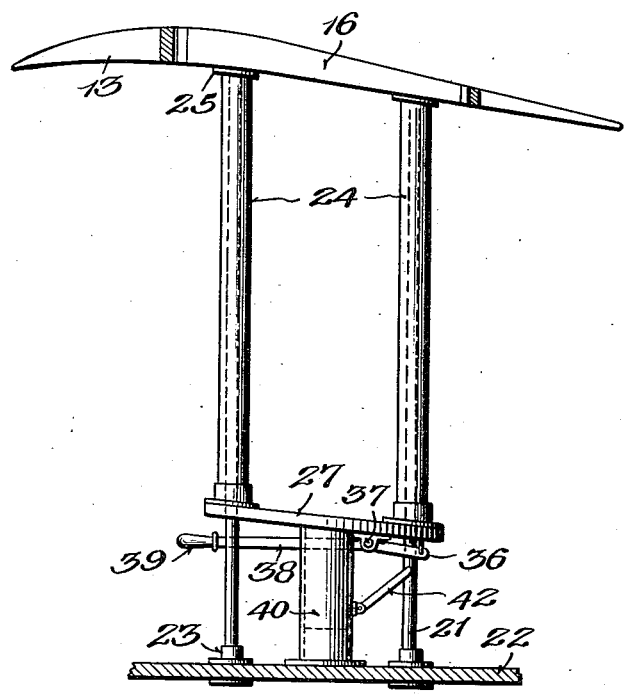
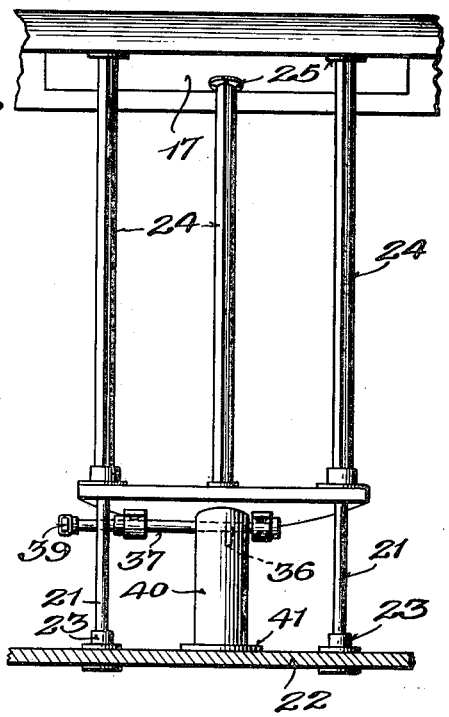
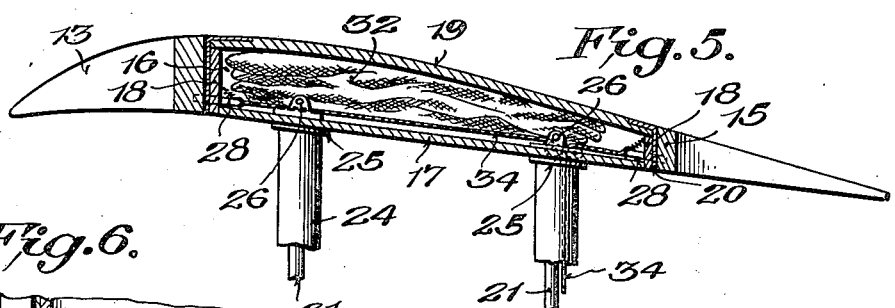
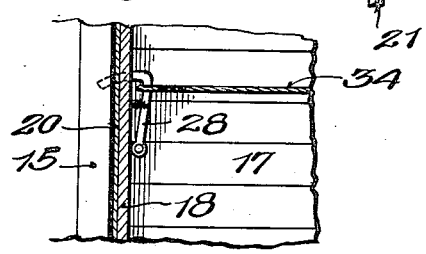
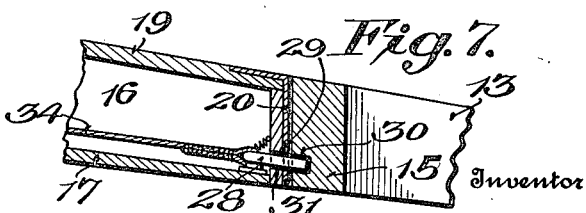

UNITED STATES PATENT OFFICE.

FREDERICK ANDREW TOWNSLEY, OF JERSEY CITY, NEW JERSEY, ASSIGNOR OF ONE-HALF TO THOMAS WATTS, OF MIDDLETOWN, NEW YORK.

LIFE-SAVING DEVICE FOR AEROPLANES.

1,337,336.

Specification of Letters Patent.

Patented Apr. 20, 1920.

Application filed September 14, 1918. Serial No. 254,032.

*To all whom it may concern:*

Be it known that I, FREDERICK ANDREW TOWNSLEY, a citizen of the United States of America, residing at Jersey City, in the county of Hudson and State of New Jersey, have invented certain new and useful Improvements in Life-Saving Devices for Aeroplanes, of which the following is a specification.

This invention relates to new and useful improvements in life saving devices for aeroplanes.

The primary object of the invention is the provision of means carried by aircraft for saving the life or lives of the pilot or persons thereon in event of an accident, such as by fire, or destruction caused by the missiles of an enemy.

A further object of the invention is the provision of a parachute for saving the lives of persons in an aircraft, the arrangement being such that the persons as well as the parachute, will be forcibly expelled clear of the craft in the event of an accident or whenever desired by the operator.

A still further object of the invention is the provision of a parachute wherein a wing member of an aeroplane is supportingly attached to the seat of the parachute, whereby upon an inflation of the parachute, the seat and its occupant will be permitted to descend in safety to the ground, the entire structure being compact and taking up no valuable space in the aircraft nor adding materially to the weight thereof.

When the invention is installed upon any form of aeroplane, none of the elements thereof will project from the craft so as to cause air eddies or in any manner interfere with the usual operation of the aeroplane, the structure also being easy and inexpensive of installation.

With these general objects in view and others that will appear as the nature of the invention is better understood, the same consists of the combination and arrangement of parts hereinafter fully described and illustrated in the accompanying drawings in which like reference characters designate corresponding parts throughout the several views.

In the drawings,

Figure 1 is a side elevation of a portion of an aeroplane with my invention installed thereon and parts broken away;

Fig. 2 is a similar view thereof with the invention illustrated in operation;

Fig. 3 is a vertical sectional view illustrating the invention at one side thereof;

Fig. 4 is a similar view forwardly of the invention;

Fig. 5 is an enlarged vertical sectional view through the central portion of the upper plane;

Fig. 6 is an enlarged detail sectional view illustrating one of the latches employed;

Fig. 7 is an enlarged vertical sectional view thereof; and

Fig. 8 is an enlarged sectional view taken upon line 8—8 of Fig. 2 showing the stream lined form of one of the supporting tubes.

While my invention is adaptable for use upon any aircraft, the same is herein illustrated installed upon an aeroplane 10 provided with a fuselage 11, forward propeller 12, upper and lower planes 13 and 14, respectively, of substantially the usual type.

The upper plane 13 is provided with an open rectangular frame 15 centrally thereof adapted to receive therein a wing or plane section 16 in the form of a tray having a bottom 17 and with opposite ends 18 slightly spaced from the forward and rear ends of the frame 15.

A lid or cover 19 formed of thin light material, such as wood, is adapted to seat upon the section 16 within the frame 15 and provided with depending end flanges 20 between the section ends 18 and the adjacent ends of the frame 15.

A plurality of upright posts 21 which may be tubular, if desired, are positioned upon the bottom 22 of the fuselage 11 projecting above the top thereof to a point substantially on a level with the bottom 17 or slightly thereabove, the said posts being securely anchored as at 23 to said fuselage bottom 22. Supports in the form of tubes 24 are secured at their upper ends, as at 25, to the bottom 17 of the section 16 and are provided with eye members 26 within the said section 16. These tubes 24 are slidably mounted upon the posts 21 with the aviator's seat 27 fixed upon the lower ends of said tubes.

A spring pressed latch 28 is swingingly mounted within each end portion of the section 16 normally extending through perforations 29 in the flanges 20 and seating within keeper sockets 30 in the adjacent end of the frame 15, the said latches also extending through openings 31 in the section ends 18. In this manner it will be seen that the section is retained within the frame 15 by the two latches 28, while the cover 19 is at the same time retained upon the section 16.

A folding parachute 32 of any desired form is normally positioned in its folded arrangement within the section 16 having the ropes 33 of the parachute secured to the eyes 26 of the tubes 24. A pull cord 34 is attached to each of the latches 28 and extends downwardly within a conduit portion 35 of one of the tubes 24, it being understood that the general form of all of said tubes 24 is stream lined in horizontal section, as best illustrated by Fig. 8 of the drawings. The stream lined form of the tubes may be provided in any manner desired, such as by employing foldably shaped coverings or casings for the tubes.

The lower end of the cord 34 is attached to a crank arm 36 of a rocker shaft 37 journaled beneath the seat 27 and having an operating lever 38 provided with a handle 39 conveniently positioned for grasping at a point adjacent the front of the seat 27.

A cylinder 40 is positioned beneath the seat 27 with the seat preferably resting thereon, the said cylinder being connected as at 41, to the bottom 22 of the fuselage. Suitable expulsion for the seat 27, tubes 24, section 16 and parachute 32, is provided within the cylinder 40 adapted to be released by the trigger 42 at the rear of the cylinder. It is obvious that an explosion charge within the cylinder 40 will affect the desired results, while a strong explosion or a compressed air charge would also be serviceable and other means of expulsion may be installed without departing from the spirit and scope of my invention.

In operation, the aviator upon the seat 27 may at any time grasp the handle 39 for shifting the lever 38 which will depress the crank 36 and release the latches 28. The lid 19 of the section 16 being so released will be forced slightly upwardly by the confined parachute 32 and will float outwardly by reason of the movement of the aircraft no matter what position the craft may assume. A slightly further depression of the crank 36 engages the trigger 42 thereby exploding or releasing the charge within the cylinder 40. This action fires or forces the seat 27 with its occupant, as well as the tubes 24, outwardly through the open frame 15. It will be obvious that the section 16 is carried outwardly with the tubes 24 as well as the parachute 32. The parachute being adapted to automatically open will support the weight of the aviator and the mechanism attached to the ropes 33 thereby permitting a gradual descent to the ground without injury.

It will be apparent that minor changes may be made in the device without departing from the spirit and scope of the invention, such for instance, as adapting the same for saving a large number of passengers as well as installing the same upon other aircraft such as balloons. My invention possesses the advantages of being easily and readily operable by the pilot and without placing any mechanism that will interfere with the usual manipulation of the aeroplane. The upper plane 13 is unimpaired in efficiency by the inclusion of my invention, while the tubes 24 impart strength as well as a manner of supporting the pilot's seat 27. Any material for the construction of the different parts may be used as desired.

The use of the invention is especially desirable for the army wherein the lives of experienced aviators may be saved when portions of their aeroplanes are destroyed by the enemy or catch fire, it being seen that the aviator and his parachute are forcibly ejected entirely clear from the aircraft by the operation of my invention readily affected by a pull upon the handle 39.

What I claim as new is:

1. In combination with an aeroplane having an upper plane provided with an open frame, a tray section within said frame, an operator's seat supported by said section, a parachute within the section and attached thereto, releasable connections between said section and frame, a lid for said section adapted for engagement by said connections when the section is normally closed, and releasing means for said connections operable at a point adjacent the said seat.

2. In combination with an aeroplane having an upper plane provided with an open frame, a tray section within said frame, an operator's seat supported by said section, a parachute within the section and attached thereto, releasable connections between said section and frame, a lid for said section adapted for engagement by said connections when the section is normally closed, releasing means for said connections operable at a point adjacent the said seat, expelling means for said seat, and tripping means for the expelling means positioned within the path of movement of said releasing means whereby the seat and its occupant are forcibly expelled subsequent to the releasing of said section and frame.

In testimony whereof I affix my signature

FREDERICK ANDREW TOWNSLEY.